Patented Aug. 22, 1950

2,519,644

UNITED STATES PATENT OFFICE 2,519,644

PURIFICATION OF LITHIUM HALIDE RESIDUE

Thomas R. P. Gibb, Jr., Marblehead, Mass., assignor to Metal Hydrides Incorporated, Beverly, Mass., a corporation of Massachusetts No Drawing. Application March 11, 1949, Serial No. 81,010

6 Claims. (Cl. 23—87)

This invention relates to the production of an anhydrous lithium halide and more especially to the purification of the lithium halide residue obtained from the manufacture of an aluminum containing hydride.

An aluminum containing hydride may be produced by reacting a suspension of lithium hydride in an anhydrous solution of an aluminum halide, such as aluminum chloride or bromide, in a volatile ether, such as diethyl ether. The product produced depends upon the relative proportions of the reactants and may be illustrated by the following equation:

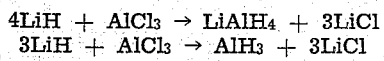
$$4LiH + AlCl_3 \rightarrow LiAlH_4 + 3LiCl$$
$$3LiH + AlCl_3 \rightarrow AlH_3 + 3LiCl$$

The aluminum containing hydride is obtained as a solution in the ether and the lithium halide is precipitated and removed by filtration. The lithium halide residue usually is contaminated with lithium hydride, lithium aluminum hydride, aluminum hydride, aluminum halide and the volatile ether solvent.

By careful evaporation of the filtrate, the lithium aluminum hydride may be obtained as a white solid having the formula $LiAlH_4$ and the aluminum hydride may be obtained as a solid aluminum hydride-ether complex having the formula $nAlH_3 \cdot O(C_2H_5)_2$ when the solvent is diethyl ether. Above 100° C. the lithium aluminum hydride decomposes slowly and at 150° C. more rapidly to form lithium hydride, aluminum and hydrogen. The aluminum hydride-ether complex also decomposes at low temperature to form aluminum metal, hydrogen and ether.

The manufacturing costs for producing an aluminum containing hydride, such as lithium aluminum hydride, at present are extremely high. Two reasons for this are the high cost of lithium hydride and the fact that at least three quarters of its lithium content is lost in the by-product of the process, that is, the lithium halide residue. This residue has little value because of the presence of contaminating impurities consisting principally of lithium and aluminum containing bodies. The presence of aluminum chloride, for example, destroys the utility of the lithium chloride mixture in air conditioning systems.

The present invention contemplates a method for purifying the lithium halide residue obtained from the manufacture of an aluminum containing hydride. The invention is based upon two principal discoveries. Thus, if a mixture of the lithium halide residue and an anhydrous ammonium halide is heated to a sufficiently high temperature a reaction takes place in which the lithium and aluminum containing impurities of said residue are converted to lithium and aluminum containing halides with the formation of hydrogen and ammonia as gaseous by-products. By heating the mixture at a temperature above or just below its melting temperature, the aluminum containing impurity can be removed by volatilization as an aluminum containing halide and the residue converted to a substantially pure anhydrous lithium halide. If an unmixed lithium halide is desired, the halogen component of the ammonium halide should be the same as that of the original lithium halide.

The temperature at which the heated mass melts depends upon the proportion of aluminum containing impurities and on the amount of ammonium halide added. It is not uncommon for the lithium halide residue from the manufacture of an aluminum containing hydride to have an initial melting temperature in the region of 400° C. to 405° C. The melting temperature increases as the aluminum containing halide and ammonium halide are removed by volatilization.

The practice of the invention is illustrated by the purification of the lithium chloride residue from the manufacture of lithium aluminum hydride by reacting a suspension of lithium hydride in an anhydrous solution of aluminum chloride in diethyl ether. This residue, which may have been heated previously to eliminate some ether, is mixed with anhydrous ammonium chloride in an amount equivalent on a molar basis to approximately ten times the combined lithium and aluminum containing impurities calculated as lithium and aluminum metals. This mixture is transferred to a sealed autoclave or retort of corrosion resistant refractory material and heated slowly, preferably, under an inert atmosphere such as nitrogen, helium or argon or under vacuum. The residual ether removed over the temperature range of 30 to 150° C. may be condensed in a separate condenser. The rate of heating should be such that the ether is not decomposed, a period of about one hour being allowed before heating above 150° C.

The mixture then is heated more strongly, preferably at a rate not more than 200° C. per hour, under an inert atmosphere or under vacuum. During the increase in temperature through the low temperature ranges, the aluminum hydride-ether complex probably is converted to aluminum metal and the lithium aluminum hydride to aluminum metal and lithium hydride. In any event, as the temperature increases the lithium and aluminum containing impurities are converted to lithium and aluminum containing chlorides in one form or another. As the temperature approaches dull red heat, aluminum chloride is volatilized together with some lithium chloride and ammonium chloride or as a double salt with either or both and, if the operation is conducted under an inert gas, forms a sublimate in the cool upper parts of the retort. If the operation is conducted in vacuo, the sublimate may enter the vacuum pipe and provision should be made for condensing it in a large diameter pipe equipped with a cooling device. Just below the melting point of the mass, the aluminum containing chloride is volatilized slowly and removed. As the temperature is increased, the rate of elimination is correspondingly increased and the melting point likewise is increased. If an unfused product is desired, a final heating should be conducted just below the melting point of lithium chloride. An optimum temperature is approximately 580° C. If a fused product is desired, the temperature may be raised to between the melting point of lithium chloride (605° C.) and 800° C. The corrosive nature of the melt makes it desirable to keep the temperature below about 650° C. The time required for complete elimination of aluminum chloride varies with the quantity present and the evaporation area. In general, a period of thirty minutes to one hour at 550° C. to 650° C. is adequate. The final purification, preferably, is conducted in vacuo. This reduces considerably the time required to eliminate the aluminum chloride. When the purification is complete as evidenced by the melting point or by analysis, the furnace is allowed to cool or the molten lithium chloride tapped and cast in molds.

The same general method is applicable for the purification of other lithium halide residues obtained from the manufacture of an aluminum containing hydride. The ammonium halide may be replaced either wholly or in part by a hydrogen halide, provided this halide is admitted as an anhydrous gas in such a way as to permeate the entire mass.

I claim:

1. The method of purifying the lithium halide residue obtained from the manufacture of an aluminum containing hydride by reacting lithium hydride with an aluminum halide, said residue being contaminated with at least one of said hydrides, which comprises slowly heating said residue to a sufficiently high temperature in the presence of a halide selected from the group consisting of ammonium and hydrogen halides to convert unhalogenated metal components of said residue to the halide state, and subsequently heating the mixture to a temperature at least just below the melting point of the mixture to remove aluminum containing halide by volatilization and obtain substantially pure anhydrous lithium halide.

2. The method of purifying the lithium halide residue obtained from the manufacture of an aluminum containing hydride by reacting lithium hydride with an aluminum halide, said residue being contaminated with at least one of said hydrides, which comprises slowly heating said residue to a sufficiently high temperature with an ammonium halide to convert unhalogenated metal components of said residue to the halide state, and subsequently heating the mixture to a temperature at least just below the melting point of the mixture to remove aluminum containing halide by volatilization and obtain substantially pure anhydrous lithium halide.

3. The method of purifying the lithium chloride residue obtained from the manufacture of an aluminum containing hydride by reacting lithium chloride with aluminum chloride, said residue being contaminated with at least one of said hydrides, which comprises slowly heating said residue to a sufficiently high temperature with ammonium chloride to convert unhalogenated metal components of said residue to the chloride state, and subsequently heating the mixture to a temperature at least just below the melting point of the mixture to remove aluminum containing chloride by volatilization and obtain substantially pure anhydrous lithium chloride.

4. The method of purifying the lithium chloride residue obtained from the manufacture of an aluminum containing hydride by reacting lithium hydride with aluminum chloride, said residue being contaminated with at least one of said hydrides, which comprises slowly heating said residue to a sufficiently high temperature with hydrogen chloride to convert unhalogenated metal components of said residue to the chloride state, and subsequently heating the mixture to a temperature at least just below the melting point of the mixture to remove aluminum containing chloride by volatilization and obtain substantially pure anhydrous lithium chloride.

5. The method of purifying the lithium halide residue obtained from the manufacture of lithium aluminum hydride by reacting lithium hydride with an aluminum halide, said residue being contaminated with lithium hydride and lithium aluminum hydride, which comprises slowly heating said residue to a sufficiently high temperature in the presence of a halide selected from the group consisting of ammonium and hydrogen halides to convert unhalogenated metal components of said residue to the halide state, and subsequently heating the mixture to a temperature at least just below the melting point of the mixture to remove aluminum containing halide by volatilization and obtain substantially pure anhydrous lithium halide.

6. The method of purifying the lithium chloride residue obtained from the manufacture of lithium aluminum hydride by reacting lithium hydride with aluminum chloride, said residue being contaminated with lithium hydride and lithium aluminum hydride, which comprises slowly heating said residue to a sufficiently high temperature with ammonium chloride to convert unhalogenated metal components of said residue to the chloride state, and subsequently heating the mixture to a temperature at least just below the melting point of the mixture to remove aluminum containing chloride by volatilization and obtain substantially pure anhydrous lithium chloride.

THOMAS R. P. GIBB, Jr.

REFERENCES CITED

The following references are of record in the file of this patent:

FOREIGN PATENTS

| Number | Country | Date |
| --- | --- | --- |
| 551,525 | Great Britain | Feb. 26, 1943 |

OTHER REFERENCES

"Introductory Information on Lithium Hydride" by Lithalays Corp., 444 Madison Avenue, New York city.

Jour. A. C. S., vol. 62 (1940), pp. 3429, 3433.
Jour. A. C. S., vol. 69 (1947), pp. 1199, 1200.